Dec. 12, 1950     F. A. CARPENTER     2,533,428
PRESSURE WATER SYSTEM
Filed Aug. 28, 1948
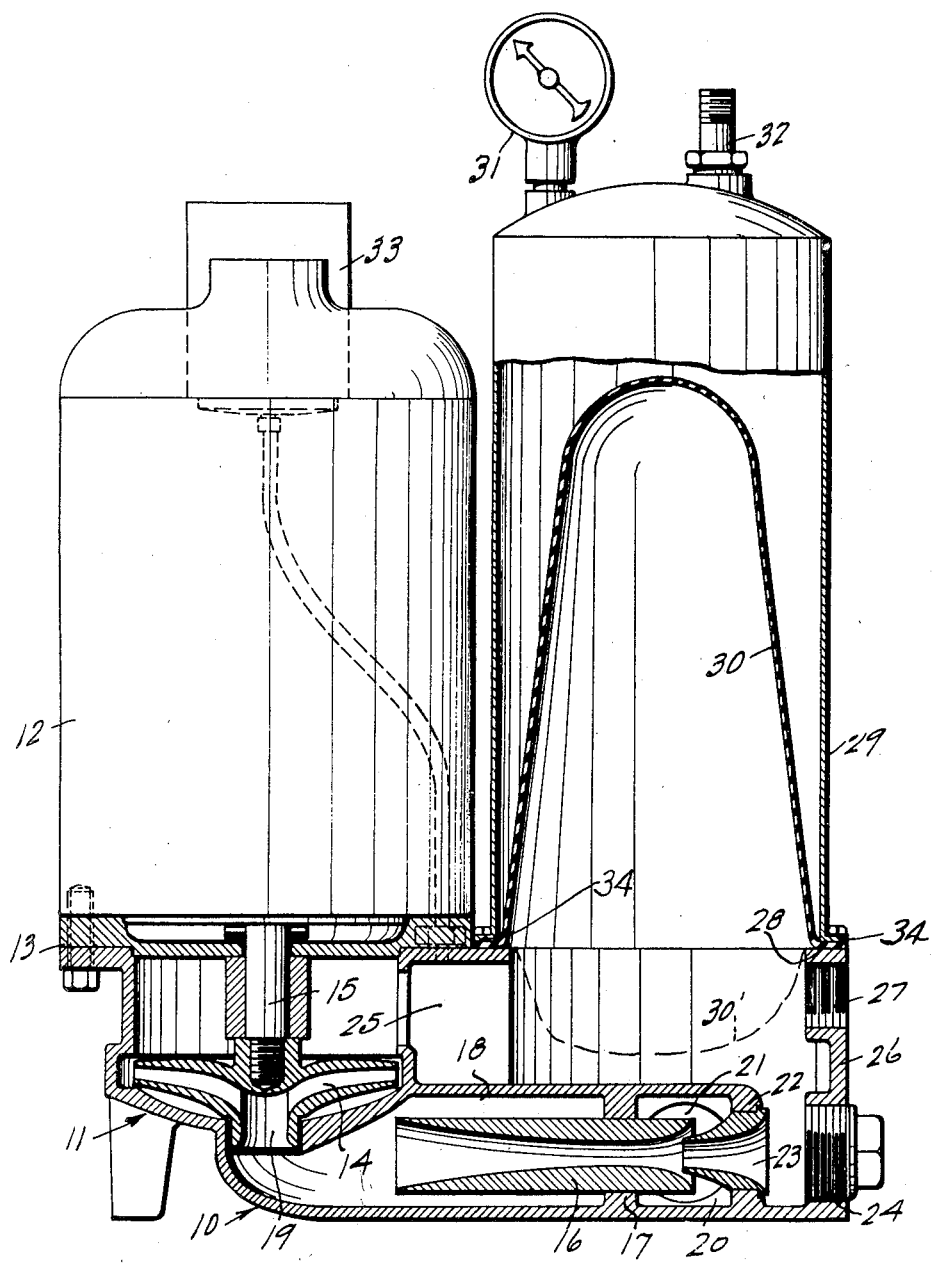
INVENTOR
Fred A. Carpenter
BY
Philip A. Friedell
Attorney Patented Dec. 12, 1950

2,533,428

UNITED STATES PATENT OFFICE 2,533,428

PRESSURE WATER SYSTEM

Fred A. Carpenter, Berkeley, Calif.

Application August 28, 1948, Serial No. 46,587

2 Claims. (Cl. 103—5)

This invention relates to improvements in water systems which are automatically controlled to provide water under pressure for instant use and particularly to water systems of this type which require a minimum of space and specifically intended for household and similar uses.

The conventional pressure water system includes a pump and driving means and control means for the driving means, and a relatively large storage tank under air pressure which provides water under pressure for instant use and which will provide a considerable amount of water before the pump is placed in operation, the pump replenishing the supply when the water level or the pressure in the tank drops to a predetermined value.

With this conventional type of water system the air under pressure is in continuous contact with the water, the water absorbs air and the air supply must be frequently replenished, and if the system should fail to operate, the water may all be drawn off with consequent escape of the air from the tank, under which conditions the tank must again be pumped full of air at the predetermined pressure before the system can be again placed in operation.

With my new system an absolute minimum of space is required, the air under pressure never needs replenishing because it is not in contact with the water, the air cannot escape if all of the water in storage is drawn off because there is no means of escape, and the storage of water is sufficient for all ordinary uses without starting the pump.

The system is ideal for ordinary household uses, for small laboratories and shops, and in any other cases where relatively small quantities of water are usually drawn, and is equally suitable for all conditions capable of supply by the pump. Where only small quantities of water are usually drawn, the pump will only operate after a predetermined quantity, say one-half to five gallons of water have been drawn, depending on the capacity of the accumulator, while with the same outfit, withdrawal of large amounts provides water under instant pressure followed by continuous pressure provided by operation of the pump.

The objects and advantages of the invention are as follows:

First, to provide a pumping system which requires an absolute minimum of space for installation.

Second, to provide a pumping system as outlined which provides water instantly under pressure in limited amount with water provided under pressure by the pump when that limited amount is exceeded.

Third, to provide a pumping system as outlined in which the air in the tank is never in contact with the water and therefore requires no replenishing.

Fourth, to provide a pumping system as outlined with a pressure tank having only an inlet for air under pressure and with no means of escape for the air so that the air under pressure in the tank is permanently maintained.

Fifth, to provide a pumping system as outlined with a diaphragm of elastic impervious material to separate the air from the water.

Sixth, to provide a pumping unit in which the pressure tank is mounted directly on the pump housing and in close proximity to the motor so as to require an absolute minimum of space.

Seventh, to provide a pumping system as outlined with a booster jet with a supply of water under pressure in direct communication with the jet, and in which any air accumulating in the diaphragm compartment will escape through the water supply outlet upon collapse of the diaphragm and thus avoid interference with the pumping system.

In describing the invention reference will be had to the accompanying drawings, in which:

The single figure is a sectional elevation through the pumping or water supply system.

The invention includes a pump housing 10 in which is located a centrifugal pump 11 at one end and driven by a motor 12 which is mounted directly on that end of the pump housing as indicated at 13, with the pump impeller 14 driven by and mounted on the motor shaft 15.

Mounted within the other end of the housing within a chamber provided therefor is a booster including a venturi 16 which is mounted in a wall 17 forming one end of the pump intake chamber 18 and directed to the intake 19 of the pump, and a low pressure intake chamber 20 has the low pressure intake 21 connected thereto and has an end wall 22 in which the jet 23 is mounted; a plugged opening 24 being in axial alignment with the jet and venturi to provide access to and permit replacement of the jet and venturi. The pump 11 discharges into the combined priming and discharge chamber 25 located above the centrifugal pump, and above the intake chamber. A discharge outlet is provided through the rear wall 26 at a level entirely above the top of the centrifugal pump to maintain a priming head, as indicated at 27, and an opening 28 is provided through the top of the housing and is substantially equal in diameter to the inside of the tank 29 which is mounted thereon with interposed rim of a bag-like elastic impervious diaphragm 30 which is preferably formed of live rubber, though it could be formed of a non-elastic material to merely collapse when water is drawn off, the tank preferably being of a minimum size necessary for the specific use, and having an open bottom with peripheral flange 34. A suitable pressure gauge 31 is provided as also an admission valve 32 for increasing the air pressure in the tank to some predetermined value, and a pressure switch 33 is controlled by the pressure of the water in the discharge chamber for controlling the motor. The motor and the tank are mounted as close together as possible, in fact, with the flange 34 in contact with the lower portion of the motor so as to take up an absolute minimum of space.

As will be understood, the intake 21 is connected to a source of water and the discharge 27 is connected through piping to the point where the water is to be used and provided with suitable shut-off means as is customary.

The tank is first filled with air at the predetermined pressure, say 20#. This forces the diaphragm down into the pump housing as indicated at 30'. The pump is primed through the discharge 27, after which the motor is cut in circuit through the pressure switch 33, operating the pump and building up pressure within the diaphragm and forcing the diaphragm to the position shown at 30 at which time the pressure of the water will have increased to the maximum, say 40# and this pressure acts on the pressure switch 33 stopping the motor. The intake line for the pump is provided with the conventional foot or check valve, not shown because it is well known in the art and is standard in such installations. The pressure thus remains within the diaphragm, and the water being out of contact with the air will not absorb any of the air.

When the discharge 27 is opened the water is discharged at maximum pressure, gradually dropping in pressure as the water is withdrawn with the diaphragm gradually being forced down toward the pump housing by the air under pressure in the tank 29, and when the pressure drops to a predetermined minimum, the pressure switch again cuts the motor in circuit, starting the pump which operates until the discharge is again closed and the diaphragm is again filled with water under the maximum pressure.

Thus the pump will not start when small quantities of water, say a half-gallon to several gallons, according to the size of the tank, are withdrawn, and water is always available under instant pressure which pressure is picked up by the pump as soon as the pressure drops to the predetermined minimum if the discharge is kept open.

Thus a pressure pumping system is provided in a very minimum of space and which is specifically suitable for household and similar uses, the tank preferably taking up no more room than that occupied by the motor and being mounted on the pump base as close to the motor as possible.

I claim:

1. A compact pressure water system for household use, comprising: a pump housing; a centrifugal pump mounted in said housing on a vertical axis and having an intake and a discharge; a combined priming and discharge chamber formed in said housing with the top of the chamber in a plane above said centrifugal pump and extending over the pump and with the pump discharging thereinto, and having a high pressure outlet located in a plane entirely above the level of the top of said pump to maintain a priming head in said combined priming and discharge chamber; a motor for driving said pump and mounted on said housing; and a pressure tank having a supply of compressed air and being of relatively small volume substantially equivalent to the volume of the motor and mounted on said housing in close proximity to said motor for minimum space requirements; said tank being open at the bottom and having a peripheral flange at the lower end, and an opening of substantially equal area to said open bottom and formed in the top of said housing for unrestricted communication between said tank and said discharge chamber, and a flexible diaphragm peripherally secured between said housing and said peripheral flange and expansible into said tank under pressure of water delivered by said centrifugal pump, and collapsible into said combined priming and discharge chamber as water is drawn off through said high pressure outlet; and a pressure switch controlled by the existent pressure in said combined priming and discharge chamber for starting said motor when said pressure drops to a predetermined value, and stopping said motor when the pressure has increased to a second predetermined value, for maintaining continuous flow under pressure when said high pressure outlet is open.

2. A structure as defined in claim 1; an intake chamber having an end wall at one end and curving upwardly to the pump intake at the other end for direct delivery of water to said intake, and formed in said housing beneath said combined priming and discharge chamber; a partition formed in said intake chamber dividing the intake chamber into a pump intake compartment and a low pressure intake compartment; a venturi mounted in said partition and terminating in spaced relation to, and directed toward said pump intake; a jet mounted in said end wall in axial alignment with said venturi and having communication with said combined priming and discharge chamber, and a low pressure intake for said low pressure intake compartment, for boosting the lift of said centrifugal pump.

FRED A. CARPENTER.

REFERENCES CITED

The following references are of record in the file of this patent:

UNITED STATES PATENTS

| Number | Name | Date |
| --- | --- | --- |
| 345,253 | Northey | July 6, 1886 |
| 1,191,469 | Rixen | July 18, 1916 |
| 1,560,044 | Derrick | Nov. 3, 1925 |
| 2,133,708 | Larson | Oct. 18, 1938 |
| 2,257,507 | Mann | Sept. 30, 1941 |
| 2,380,924 | Carpenter | Aug. 7, 1945 |